United States Patent
Xiang

(10) Patent No.: US 9,807,785 B2
(45) Date of Patent: Oct. 31, 2017

(54) SCHEDULING AND PROCESSING METHOD AND APPARATUS FOR WIFI STATION

(71) Applicant: Huawei Device Co., Ltd., Shenzhen (CN)

(72) Inventor: Chao Xiang, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 43 days.

(21) Appl. No.: 14/900,969

(22) PCT Filed: Jul. 25, 2014

(86) PCT No.: PCT/CN2014/082982
§ 371 (c)(1),
(2) Date: Dec. 22, 2015

(87) PCT Pub. No.: WO2015/014242
PCT Pub. Date: Feb. 5, 2015

(65) Prior Publication Data
US 2016/0157261 A1    Jun. 2, 2016

(30) Foreign Application Priority Data

Jul. 30, 2013 (CN) .......................... 2013 1 0326654

(51) Int. Cl.
*H04W 84/12* (2009.01)
*H04W 72/12* (2009.01)
*H04W 74/04* (2009.01)

(52) U.S. Cl.
CPC ....... *H04W 72/1247* (2013.01); *H04W 74/04* (2013.01); *H04W 84/12* (2013.01)

(58) Field of Classification Search
CPC . H04W 72/1247; H04W 74/04; H04W 84/12; H04W 36/22; H04W 28/18
See application file for complete search history.

(56) References Cited

U.S. PATENT DOCUMENTS

| 5,914,950 A | 6/1999 | Tiedemann, Jr. et al. |
| 2003/0108059 A1 | 6/2003 | Yew et al. |
| 2003/0181211 A1* | 9/2003 | Razavilar ............ H04W 16/10 455/450 |

(Continued)

FOREIGN PATENT DOCUMENTS

| CN | 101877912 A | 11/2010 |
| CN | 102083221 A | 6/2011 |

(Continued)

OTHER PUBLICATIONS

Foreign Communication From a Counterpart Application, European Application No. 14831595.5, Extended European Search Report dated May 12, 2016, 9 pages.

(Continued)

*Primary Examiner* — Thai Nguyen
(74) *Attorney, Agent, or Firm* — Conley Rose, P.C.

(57) ABSTRACT

A scheduling and processing method and apparatus for a wireless fidelity (WiFi) station (STA), which resolve a prior-art problem that when multiple STAs are connected to WiFi by means of one access point (AP), due to bandwidth contention, once a STA sensitive to a radio frequency signal is connected to the WiFi, the STA may occupy almost all bandwidth for data exchange, causing a decrease in quality of service of data transmission of the other STAs. The method includes the following steps: acquiring network connection information, within a predetermined time, of STAs that are connected to a WiFi network by means of an AP; sorting the network connection information of the STAs in accordance with priorities according to a predetermined algorithm, to obtain a level list of the STAs; and scheduling and processing to-be-processed data of a corresponding STA according to the level list.

18 Claims, 8 Drawing Sheets

(56) References Cited

U.S. PATENT DOCUMENTS

| | | | |
|---|---|---|---|
| 2005/0215265 A1* | 9/2005 | Sharma | H04L 47/125 |
| | | | 455/453 |
| 2009/0040977 A1 | 2/2009 | Lee | |
| 2009/0046642 A1 | 2/2009 | Damnjanovic | |

FOREIGN PATENT DOCUMENTS

| | | |
|---|---|---|
| CN | 102404861 A | 4/2012 |
| CN | 102572799 A | 7/2012 |
| JP | 2003070053 A | 3/2003 |
| JP | 2006352545 A | 12/2006 |
| JP | 2007166593 A | 6/2007 |
| JP | 2010193080 A | 9/2010 |

OTHER PUBLICATIONS

Partial English Translation and Abstract of Chinese Patent Application No. CN101877912, Dec. 23, 2015, 5 pages.

Partial English Translation and Abstract of Chinese Patent Application No. CN102572799, Dec. 23, 2015, 7 pages.

Foreign Communication From a Counterpart Application, PCT Application No. PCT/CN2014/082982, English Translation of International Search Report dated Sep. 30, 2014, 2 pages.

Foreign Communication From a Counterpart Application, PCT Application No. PCT/CN2014/082982, English Translation of Written Opinion dated Sep. 30, 2014, 12 pages.

Machine Translation and Abstract of Japanese Publication No. JP20030070053, Mar. 7, 2003, 17 pages.

Machine Translation and Abstract of Japanese Publication No. JP2006352545, Dec. 28, 2006, 15 pages.

Foreign Communication From a Counterpart Application, Japanese Application No. 2016-528337, Japanese Office Action dated Feb. 21, 2017, 3 pages.

Foreign Communication From a Counterpart Application, Japanese Application No. 2016-528337, English Translation of Japanese Office Action dated Feb. 21, 2017, 3 pages.

* cited by examiner

SCHEDULING AND PROCESSING METHOD AND APPARATUS FOR WIFI STATION

CROSS-REFERENCE TO RELATED APPLICATIONS

This application is a National Stage of International Application No. PCT/CN2014/082982, filed on Jul. 25, 2014, which claims priority to Chinese Patent Application No. 201310326654.9, filed on Jul. 30, 2013, both of which are hereby incorporated by reference in their entireties.

TECHNICAL FIELD

The present disclosure relates to the field of wireless communications technologies, and in particular, to a scheduling and processing method and apparatus for a wireless fidelity (WiFi) station (STA).

BACKGROUND

A terminal station is connected to WiFi by means of an access point (AP) to perform data exchange. The terminal station is a STA, for example, a laptop computer connected to WiFi for data downloading, an IPAD connected to WiFi for games or webpage browsing, a wireless set top box connected to WiFi for video and audio services of Internet Protocol Television (IPTV), and the like all belong to STAs.

A STA performs data exchange with an AP by means of a radio frequency signal. Because some STAs are sensitive to a radio frequency signal, when multiple STAs are connected to WiFi by means of one AP at the same time, due to bandwidth contention, once a STA sensitive to a radio frequency signal is connected to the WiFi, the STA may occupy almost all bandwidth for data exchange, while the other STAs can only receive data and cannot send data, causing a decrease in quality of service of data transmission of the other STAs.

SUMMARY

Embodiments of the present disclosure provide a scheduling and processing method and apparatus for a WiFi station, thereby implementing effective and balanced data transmission of multiple STAs, and improving quality of service of the multiple STAs.

In order to achieve the foregoing objective, the following technical solutions are used in the embodiments of the present disclosure.

According to a first aspect, the present disclosure provides a scheduling and processing method for a WiFi station, including acquiring network connection information, within a predetermined time, of STAs that are connected to a WiFi network by means of an AP, where the network connection information includes identifiers of the STAs, and at least one of accumulated network connection duration, accumulated data usage, and accumulated quantities of times of network connections that are within the predetermined time and correspond to the STAs; sorting the network connection information of the STAs in accordance with priorities according to a predetermined algorithm, to obtain a level list of the STAs, where the level list records a level sequence of the STAs in the level list; and scheduling and processing to-be-processed data of a corresponding STA according to the level list.

In a first possible implementation manner of the first aspect, the sorting the network connection information of the STAs in accordance with priorities according to a predetermined algorithm, to obtain a level list of the STAs includes calculating a ratio between accumulated data usage and accumulated network connection duration that are within the predetermined time and of each of the STAs, to acquire first average data usage of each of the STAs; obtaining a summation value of each of the STAs according to weighted summation performed on the accumulated network connection duration, an accumulated quantity of times of network connections, and the first average data usage of each of the STAs, where three weight values of the weighted summation are all greater than or equal to 0, a sum of the three weight values is 1, and at least one of the weight values is not 0; and sorting the STAs according to a sequence of the summation values, to acquire the level list of the STAs, where the level list includes identifiers of the STAs sorted according to the summation values, and first average data usage corresponding to the STAs.

With reference to the first aspect or the first possible implementation manner of the first aspect, in a second possible implementation manner, after the AP establishes the level list of the STAs, the method further includes acquiring an identifier of a second STA that is connected to the WiFi network again by means of the AP; determining, by using the identifier of the second STA, whether the second STA exists in the level list; acquiring network connection information, within the predetermined time, of the second STA when the second STA exists in the level list; comparing amounts of second average data usage of the second STA and first average data usage of a first STA, in the level list, corresponding to the identifier of the second STA, where the second average data usage of the second STA is a ratio between accumulated data usage and accumulated network connection duration of the second STA; and updating a level of the second STA in the level list according to a result of the comparison between the second average data usage of the second STA and the first average data usage of the first STA.

With reference to the second possible implementation manner of the first aspect, in a third possible implementation manner, the acquiring network connection information, within the predetermined time, of the second STA when the second STA exists in the level list includes, when the second STA exists in the level list, determining whether the first STA corresponding to the second STA reaches an aging time, where the aging time is a validity time of a STA in the level list; when the first STA reaches the aging time, deleting the identifier of the first STA and the first average data usage corresponding to the first STA that are in the level list, and to-be-processed data of the second STA; and when the first STA does not reach the aging time, acquiring the network connection information, within the predetermined time, of the second STA.

With reference to the second possible implementation manner or the third possible implementation manner of the first aspect, in a fourth possible implementation manner, the updating a level of the second STA in the level list according to a result of the comparison between the second average data usage of the second STA and the first average data usage of the first STA includes obtaining a summation value of the second STA according to weighted summation performed on the accumulated network connection duration, an accumulated quantity of times of network connections, and the second average data usage of the second STA, where three weight values of the weighted summation of the second STA are all greater than or equal to 0, a sum of the three weight values is 1, and at least one of the weight values is not 0; when the second average data usage is greater than the first average data usage, determining whether the summation value of the second STA is greater than a first threshold; and when the summation value of the second STA is greater than the first threshold, raising, according to a ratio of the summation value of the second STA to the first threshold, the level of the second STA in the level list by a specified quantity of levels that corresponds to the ratio.

With reference to the fourth possible implementation manner of the first aspect, in a fifth possible implementation manner, the method further includes, when the summation value of the second STA is not greater than the first threshold, acquiring the network connection information, within the predetermined time, of the second STA; and updating the level of the second STA in the level list according to the network connection information of the second STA.

With reference to the fourth possible implementation manner of the first aspect, in a sixth possible implementation manner, the method further includes determining, when the second average data usage is not greater than the first average data usage, whether the summation value of the second STA is less than a second threshold; and when the summation value of the second STA is less than the second threshold, lowering, according to a ratio of the second threshold to the summation value of the second STA, the level of the second STA in the level list by a specified quantity of levels that corresponds to the ratio.

With reference to the sixth possible implementation manner of the first aspect, in a seventh possible implementation manner, the determining, when the second average data usage is not greater than the first average data usage, whether the summation value of the second STA is less than a second threshold includes, when the second average data usage is not greater than the first average data usage, determining whether the first STA corresponding to the second STA reaches the aging time; when the first STA reaches the aging time, deleting the identifier of the first STA and the first average data usage corresponding to the first STA that are in the level list, and the to-be-processed data of the second STA; and when the first STA does not reach the aging time, determining whether the summation value of the second STA is less than the second threshold.

With reference to the sixth possible implementation manner or the seventh possible implementation manner of the first aspect, in an eighth possible implementation manner, the method further includes, when the summation value of the second STA is not less than the second threshold, acquiring the network connection information, within the predetermined time, of the second STA; and updating the level of the second STA in the level list according to the network connection information of the second STA.

With reference to the second possible implementation manner of the first aspect, in a ninth possible implementation manner, the method further includes, when the second STA does not exist in the level list, writing the identifier of the second STA and to-be-processed data of the second STA into the tail of the level list, and acquiring network connection information, within the predetermined time, of the second STA; and updating the level of the second STA in the level list according to the network connection information of the second STA.

With reference to the second possible implementation manner of the first aspect, in a tenth possible implementation manner, the method further includes, when the second STA does not exist in the level list, acquiring network connection information, within the predetermined time, of the second STA; and writing the identifier of the second STA and to-be-processed data of the second STA into a proper location of the level list according to the network connection information of the second STA.

According to a second aspect, the present disclosure provides a scheduling and processing apparatus for a WiFi station, including a network connection information acquiring unit configured to acquire network connection information, within a predetermined time, of STAs that are connected to a WiFi network by means of an AP, where the network connection information includes identifiers of the STAs, and at least one of accumulated network connection duration, accumulated data usage, and accumulated quantities of times of network connections that are within the predetermined time and correspond to the STAs; a level list determining unit configured to sort the network connection information, acquired by the acquiring unit, of the STAs in accordance with priorities according to a predetermined algorithm, to obtain a level list of the STAs, where the level list records a level sequence of the STAs in the level list; and a data processing unit configured to schedule and process to-be-processed data of a corresponding STA according to the sequence of the level list that is obtained by the level list determining unit.

In a first possible implementation manner of the second aspect, the level list determining unit includes a calculation module configured to calculate a ratio between accumulated data usage and accumulated network connection duration that are within the predetermined time and of each of the STAs, to acquire first average data usage of each of the STAs; a summation value determining module configured to obtain a summation value of each of the STAs according to weighted summation performed on the accumulated network connection duration, an accumulated quantity of times of network connections, and the first average data usage of each of the STAs, where three weight values of the weighted summation are all greater than or equal to 0, a sum of the three weight values is 1, and at least one of the weight values is not 0; and a list module configured to sort the STAs according to the summation values in a descending order, to acquire the level list of the STAs, where the level list includes identifiers of the STAs sorted according to the summation values, and first average data usage corresponding to the STAs.

With reference to the second aspect or the first possible implementation manner of the second aspect, in a second possible implementation manner, the apparatus further includes an identifier acquiring unit configured to acquire an identifier of a second STA that is connected to the WiFi network again by means of the AP; a determining unit configured to determine, by using the identifier of the second STA, whether the second STA exists in the level list, where the network connection information acquiring unit is further configured to, when the second STA exists in the level list, acquire network connection information, within the predetermined time, of the second STA; a comparison unit configured to compare amounts of second average data usage of the second STA and first average data usage of a first STA, in the level list, corresponding to the identifier of the second STA, where the second average data usage of the second STA is a ratio between accumulated data usage and accumulated network connection duration of the second STA; and a level list updating unit configured to update a level of the second STA in the level list according to a result of the comparison between the second average data usage of the second STA and the first average data usage of the first STA.

With reference to the second possible implementation manner of the second aspect, in a third possible implementation manner, the network connection information acquiring unit includes an aging time determining module configured to, when the second STA exists in the level list, determine whether the first STA corresponding to the second STA reaches an aging time, where the aging time is a validity time of a STA in the level list; a deletion module configured to, when the first STA reaches the aging time, delete the identifier of the first STA and the first average data usage corresponding to the first STA that are in the level list, and to-be-processed data of the second STA; and an acquiring module configured to, when the first STA does not reach the aging time, acquire the network connection information, within the predetermined time, of the second STA.

With reference to the second possible implementation manner or the third possible implementation manner of the second aspect, in a fourth possible implementation manner, the level list updating unit includes a summation value determining module configured to obtain a summation value of the second STA according to weighted summation performed on the accumulated network connection duration, an accumulated quantity of times of network connections, and the second average data usage of the second STA, where three weight values of the weighted summation of the second STA are all greater than or equal to 0, a sum of the three weight values is 1, and at least one of the weight values is not 0; a determining module configured to, when the second average data usage is greater than the first average data usage, determine whether the summation value of the second STA is greater than a first threshold; and an updating module configured to, when the summation value of the second STA is greater than the first threshold, raise, according to a ratio of the summation value of the second STA to the first threshold, the level of the second STA in the level list by a specified quantity of levels that corresponds to the ratio.

With reference to the fourth possible implementation manner of the second aspect, in a fifth possible implementation manner, the network connection information acquiring unit is further configured to, when the summation value of the second STA is not greater than the first threshold, acquire the network connection information, within the predetermined time, of the second STA; and the level list updating unit is further configured to update the level of the second STA in the level list according to the network connection information of the second STA.

With reference to the fourth possible implementation manner of the second aspect, in a sixth possible implementation manner, the level list updating unit includes the determining module is further configured to, when the second average data usage is not greater than the first average data usage, determine whether the summation value of the second STA is less than a second threshold; and the updating module is further configured to, when the summation value of the second STA is less than the second threshold, lower, according to a ratio of the second threshold to the summation value of the second STA, the level of the second STA in the level list by a specified quantity of levels that corresponds to the ratio.

With reference to the sixth possible implementation manner of the second aspect, in a seventh possible implementation manner, the determining module further includes an aging time determining submodule configured to, when the second average data usage is not greater than the first average data usage, determine whether the first STA corresponding to the second STA reaches the aging time; a deletion submodule configured to, when the first STA reaches the aging time, delete the identifier of the first STA and the first average data usage corresponding to the first STA that are in the level list, and the to-be-processed data of the second STA; and a determining submodule configured to, when the first STA does not reach the aging time, determine whether the summation value of the second STA is less than the second threshold.

With reference to the sixth possible implementation manner or the seventh possible implementation manner of the second aspect, in an eighth possible implementation manner, the network connection information acquiring unit is further configured to, when the summation value of the second STA is not less than the second threshold, acquire the network connection information, within the predetermined time, of the second STA; and the level list updating unit is further configured to update the level of the second STA in the level list according to the network connection information of the second STA.

With reference to the second possible implementation manner of the second aspect, in a ninth possible implementation manner, the network connection information acquiring unit is further configured to, when the second STA does not exist in the level list, write the identifier of the second STA and to-be-processed data of the second STA into the tail of the level list, and acquire the network connection information, within the predetermined time, of the second STA; and the level list updating unit is further configured to update the level of the second STA in the level list according to the network connection information of the second STA.

With reference to the second possible implementation manner of the second aspect, in a tenth possible implementation manner, the network connection information acquiring unit is further configured to, when the second STA does not exist in the level list, acquire the network connection information, within the predetermined time, of the second STA; and the level list updating unit is further configured to write the identifier of the second STA and to-be-processed data of the second STA into a proper location of the level list according to the network connection information of the second STA.

In the scheduling and processing method and apparatus for a WiFi station provided in the embodiments of the present disclosure, an AP acquires network connection information, within a predetermined time, of STAs that are connected to a WiFi network by means of the AP; sorts the network connection information of the STAs in accordance with priorities according to a predetermined algorithm, to obtain a level list of the STAs; and schedules and processes to-be-processed data of a corresponding STA according to the level list. The embodiments of the present disclosure resolve a prior-art problem that when multiple STAs are connected to WiFi by means of one AP at the same time, due to bandwidth contention, once a STA sensitive to a radio frequency signal is connected to the WiFi, the STA may occupy almost all bandwidth for data exchange, while the other STAs can only receive data and cannot send data, causing a decrease in quality of service of data transmission of the other STAs; implement effective and balanced data transmission of the multiple STAs; and improve quality of service of the multiple STAs.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 1 is a flowchart of a scheduling and processing method for a WiFi station according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
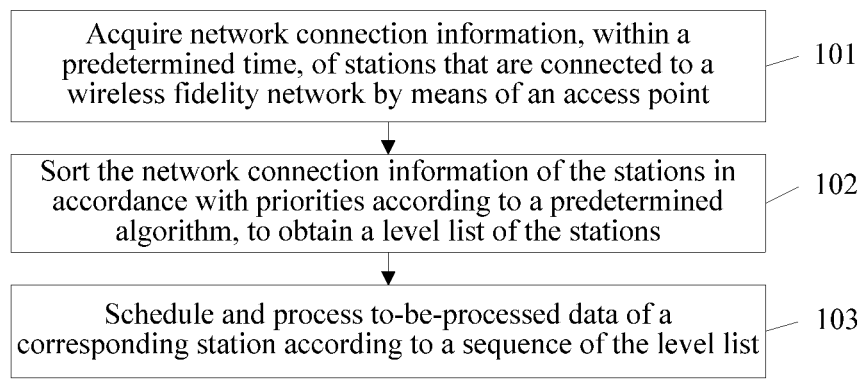

As shown in FIG. 1, an embodiment of the present disclosure provides a scheduling and processing method for a WiFi station. The method in this embodiment of the present disclosure may be executed by an AP in a WiFi network. The method includes the following steps.

101: Acquire network connection information, within a predetermined time, of STAs that are connected to a WiFi network by means of an AP, where the network connection information includes identifiers of the STAs, and at least one of accumulated network connection duration, accumulated data usage, and accumulated quantities of times of network connections that are within the predetermined time and correspond to the STAs.

With reference to the prior art, in a process in which the STA is connected to the WiFi network by means of the AP, the STA receives a broadcast beacon packet sent by the AP; the STA sends a probe request packet to the AP according to a network connection requirement; the AP responds with a probe response packet according to a requirement, and then, the STA sends an authentication request packet to the AP; after receiving the authentication request packet, the AP sends an authentication response packet to the STA; the STA sends an association request packet to the AP; after receiving the association request packet, the AP sends an association response packet to the STA, where the association response packet carries a session association identifier (ID) allocated to the STA by the AP, so that the STA initiates key negotiation with the AP according to the session association ID; and after the key negotiation succeeds, the STA acquires a DHCP address, and after an IP address is acquired successfully, the STA can perform a data service by using the Internet Protocol (IP).

The AP detects a STA that is connected to the WiFi network by means of the AP or a STA that is disconnected from the WiFi network by means of the AP, so as to acquire network connection information, within the predetermined time, of all STAs connected to the WiFi network. A quantity of the acquired STAs connected to the WiFi network may be at least one, and is not limited. The network connection information of the STAs includes identifiers of the STAs, and at least one of accumulated network connection duration, accumulated data usage, and accumulated quantities of times of network connections that are within the predetermined time and correspond to the STAs. The identifiers of the STAs may be Media Access Control (MAC) addresses or IP addresses of the STAs, or may be other information that can uniquely identify the STAs. Each STA corresponds to at least one of accumulated network connection duration, accumulated data usage, and an accumulated quantity of times of network connections. The predetermined time may be 24 hours, or a week, which is not limited herein, and is set by a user autonomously according to a requirement.

102: Sort the network connection information of the STAs in accordance with priorities according to a predetermined algorithm, to obtain a level list of the STAs, where the level list records a level sequence of the STAs in the level list.

Because the acquired network connection information of the STAs includes at least one of the accumulated network connection duration, the accumulated data usage, and the accumulated quantities of times of network connections that are within the predetermined time and of the STAs, according to different acquired network connection information, different predetermined algorithms are used for sorting in accordance with priorities.

Optionally, when the acquired network connection information of the STAs includes the accumulated network connection duration, within the predetermined time, of the STA, the STAs are sorted in accordance with priorities according to lengths of the acquired accumulated network connection duration of the STAs, to obtain a level list of the STAs. A STA having longer accumulated network connection duration has a higher priority, and a STA having shorter accumulated network connection duration has a lower priority.

Similarly, optionally, when the acquired network connection information of the STAs includes the accumulated data usage or the accumulated quantities of times of network connections, within the predetermined time, of the STAs, the STAs are sorted in accordance with priorities according to amounts of the accumulated data usage of the STAs or accumulated quantities of times of network connections of the STAs, to obtain a level list of the STAs. A STA having more accumulated data usage or a larger accumulated quantity of times of network connections has a higher priority, and a STA having less accumulated data usage or a smaller accumulated quantity of times of network connections has a lower priority.

Optionally, when the acquired network connection information of the STA includes the accumulated network connection duration and the accumulated data usage that are within the predetermined time and of the STAs, a ratio between accumulated data usage and accumulated network connection duration that are within the predetermined time and of each of the STAs is calculated, to obtain average data usage of each of the STAs, and the STAs are sorted in accordance with priorities according to amounts of the average data usage of the STAs, to obtain a level list of the STAs. A STA having more average data usage has a higher priority, and a STA having less average data usage has a lower priority.

Optionally, when the acquired network connection information of the STAs includes the accumulated network connection duration and the accumulated quantity of times of network connections that are within the predetermined time and of the STAs, a ratio between accumulated quantity of times of network connections and accumulated network connection duration that are within the predetermined time and of each of the STAs is calculated, to obtain an average quantity of times of network connections of each of the STAs, and the STAs are sorted in accordance with priorities according to the average quantities of times of network connections of the STAs, to obtain a level list of the STAs. A STA having a larger average quantity of times of network connections has a higher priority, and a STA having a smaller average quantity of times of network connections has a lower priority.

Optionally, when the acquired network connection information of the STAs includes the accumulated network connection duration and the accumulated data usage that are within the predetermined time and of the STAs, or the accumulated network connection duration and the accumulated quantities of times of network connections, or the accumulated data usage and the accumulated quantities of times of network connections, a summation value of each STA is calculated in a weighted summation manner, for example, accumulated network connection duration is X, and a corresponding weight value is a; accumulated data usage is Y, and a corresponding weight value is b; an accumulated quantity of times of network connections is Z, and a corresponding weight value is c.

When the accumulated network connection duration and the accumulated data usage of the STAs are acquired, a corresponding summation value H1 is obtained by using a formula (1), and the STAs are sorted in accordance with priorities according to the summation values H1 in a descending order, to obtain a level list of the STAs, where the formula (1) is shown in the following:

$$H1=a*X+b*Y, \text{ where } a>0, b>0, \text{ and } a+b=1 \qquad (1).$$

When the accumulated network connection duration and the accumulated quantity of times of network connections of the STAs are acquired, a corresponding summation value H2 is obtained by using a formula (2), and the STAs are sorted in accordance with priorities according to the summation values H2 in a descending order, to obtain a level list of the STAs, where the formula (2) is shown in the following:

$$H2=a*X+c*Z, \text{ where } a>0, c>0, \text{ and } a+c=1 \qquad (2).$$

When the accumulated data usage and the accumulated quantity of times of network connections of the STAs are acquired, a corresponding summation value H3 is obtained by using a formula (3), and the STAs are sorted in accordance with priorities according to the summation values H3 in a descending order, to obtain the level list of the STAs, where the formula (3) is shown in the following:

$$H2=b*Y+c*Z, \text{ where } b>0, c>0, \text{ and } b+c=1 \qquad (3).$$

Figure 2:
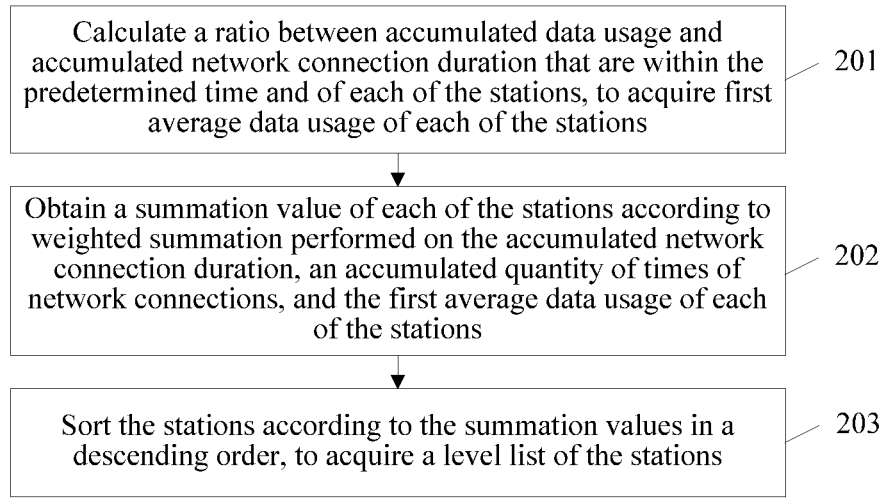
FIG. 2 is a flowchart of obtaining a level list of the STAs in the scheduling and processing method for a WiFi station according to the embodiment of the present disclosure.

Preferably, when the acquired network connection information of the STAs includes the accumulated network connection duration, the accumulated data usage, and the accumulated quantity of times of network connections that are within the predetermined time and of the STAs, as shown in FIG. 2, the STAs are sorted in accordance with priorities according to a predetermined algorithm, to obtain a level list of the STAs, which is shown in step 201 to step 203 as follows.

201: Calculate a ratio between accumulated data usage and accumulated network connection duration that are within the predetermined time and of each of the STAs, to acquire first average data usage of each of the STAs.

The first average data usage is data usage of the STA per second.

202: Obtain a summation value of each of the STAs according to weighted summation performed on the accumulated network connection duration, an accumulated quantity of times of network connections, and the first average data usage of each of the STAs, where three weight values of the weighted summation are all greater than or equal to 0, a sum of the three weight values is 1, and at least one of the weight values is not 0.

For example, it is assumed that the accumulated network connection duration is R, and a corresponding weight value is e; the accumulated quantity of times of network connections is S, and a corresponding weight value is f; and the first average data usage is P, and a corresponding weight value is g; a summation value W of the STA is obtained by using a formula (4), where the formula (4) is shown in the following:

$$W=e*R+f*S+g*P \qquad (4);$$

where e, f, and g are all greater than or equal to 0, e+f+g=1, and at least one of e, f, and g is not 0. For example, the weight value e of the accumulated network connection duration is 0.3, the weight value f of the accumulated quantity of times of network connections is 0.5, the weight value g of the first average data usage is 0.2; or the weight value e of the accumulated network connection duration is 0.8, the weight value of the accumulated quantity of times of network connections is 0, and the weight value g of the first average data usage is 0.2; and so on; when the summation value is calculated, it is unnecessary that all the three values are used, which is not limited herein; certainly, the foregoing three values are used preferably for calculating the summation value, and the weight values are not limited.

203: Sort the STAs according to the summation values in a descending order, to acquire the level list of the STAs, where the level list includes identifiers of the STAs sorted according to the summation values, and first average data usage corresponding to the STAs.

The corresponding STAs are sorted in a descending order according to the summation values obtained in step 202, to obtain the level list of the STAs, where a larger summation value indicates that a corresponding STA has a higher priority in the level list. The list includes the identifiers of the STAs sorted according to the summation values, and the first average data usage, obtained in step 201, corresponding to the STAs.

103: Schedule and process to-be-processed data of a corresponding STA according to the level list.

A corresponding logical cache queue of a STA is generated according to the level list, where the logical cache queue of the STA includes to-be-processed data corresponding to the STA. The to-be-processed data in the corresponding logical cache queue of the STA is scheduled and processed according to the level sequence in the level list.

In the level list, a STA arranged in front has a higher priority, and to-be-processed data corresponding to the STA is processed preferentially. That is, a logical cache queue of each STA is generated, and the logical cache queue includes to-be-processed data of a corresponding STA. One STA corresponds to one logical cache queue, and the logical cache queue includes to-be-processed data of the STA. To-be-processed data in a logical cache queue of each STA is scheduled and processed according to a level of the corresponding STA in the level list, where to-be-processed data in a corresponding logical cache queue of a high-level STA is scheduled and processed preferentially, and to-be-processed data in a corresponding logical cache queue of a low-level STA is scheduled and processed later.

In the scheduling and processing method for a WiFi station provided in this embodiment of the present disclosure, an AP acquires network connection information, within a predetermined time, of STAs that are connected to a WiFi network by means of the AP; sorts the network connection information of the STAs in accordance with priorities according to a predetermined algorithm, to obtain a level list of the STAs; and schedules and processes to-be-processed data of a corresponding STA according to the level list. This embodiment of the present disclosure resolves a prior-art problem that when multiple STAs are connected to WiFi by means of one AP at the same time, due to bandwidth contention, once a STA sensitive to a radio frequency signal is connected to the WiFi, the STA may occupy almost all bandwidth for data exchange, while the other STAs can only receive data and cannot send data, causing a decrease in quality of service of data transmission of the other STAs; implements effective and balanced data transmission of multiple STAs; and improves quality of service of the multiple STAs.

To help a person skilled in the art better understand the technical solution of the scheduling and processing method for a WiFi station provided in this embodiment of the present disclosure, the following describes, in detail by using a specific embodiment, the scheduling and processing method for a WiFi station provided in the present disclosure.

Figure 3:
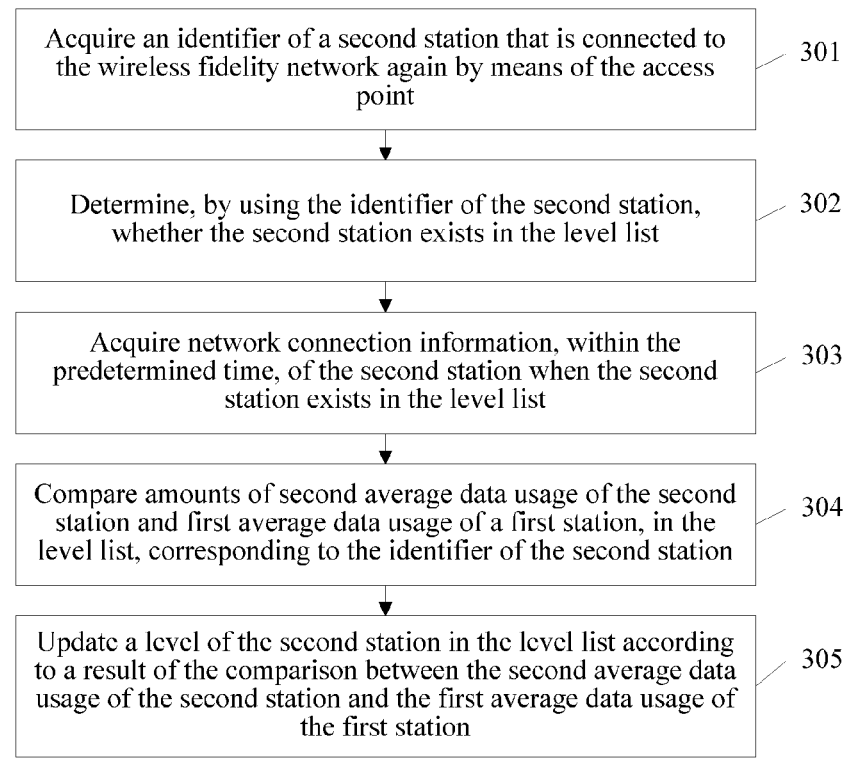
FIG. 3 is a flowchart of a scheduling and processing method for a WiFi station, connected to a WiFi network again by means of an AP, after the AP establishes a level list of the STAs in the scheduling and processing method for a WiFi station according to an embodiment of the present disclosure.

A STA in this embodiment may be a WiFi terminal connected to a WiFi network, such as a laptop computer, an IPAD, or a wireless set top box. After establishing a level list of the STAs, the AP performs a series of processing on a STA that is connected to the WiFi network again by means of the AP, so as to update the level list in real time, so that the AP updates a priority of the STA in the level list according to changing network connection information of the STA, thereby scheduling and processing to-be-processed data of the STA. As shown in FIG. 3, the method in this embodiment of the present disclosure is also executed by an AP on a WiFi network, and includes the following steps.

301: Acquire an identifier of a second STA that is connected to the WiFi network again by means of the AP.

The identifier of the second STA may be a MAC address or an IP address of the STA, or may be other information that can uniquely identify the second STA.

302: Determine, by using the identifier of the second STA, whether the second STA exists in the level list.

Because the level list includes an identifier, acquired within the predetermined time, of a STA that is connected to the WiFi network by means of the AP, matching is performed between the acquired identifier of the second STA and an identifier of a STA in the level list, to determine whether the second STA exists in the level list.

303: Acquire network connection information, within the predetermined time, of the second STA when the second STA exists in the level list.

When the acquired identifier of the second STA matches an identifier of a STA in the level list successfully, it indicates that the second STA already exists in the level list.

Figure 4:
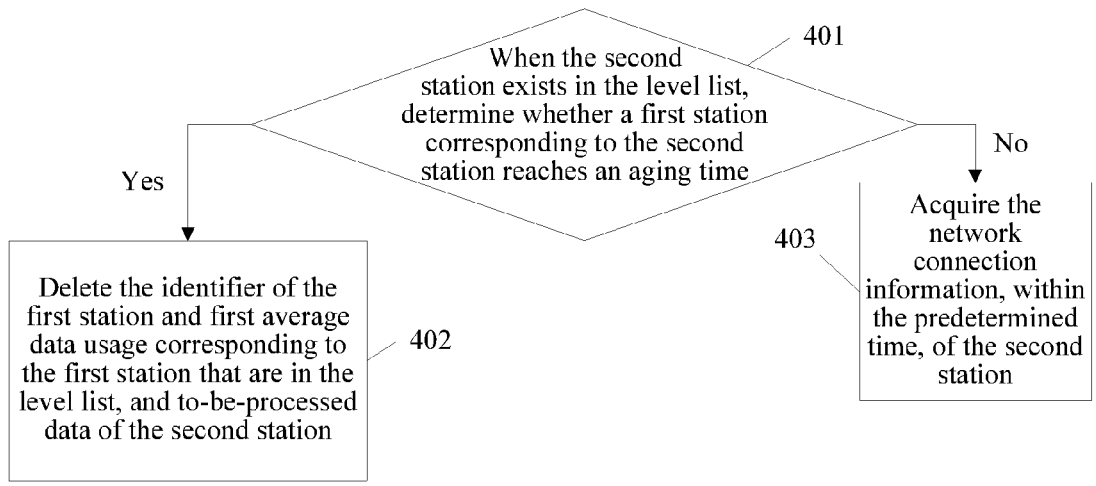
FIG. 4 is a flowchart of implementation of step 303 in the scheduling and processing method for a WiFi station according to the embodiment of the present disclosure.

An aging time is set for a STA in the level list, where the aging time refers to a validity time of the STA in the level list. When the STA is recorded in the level list, timing is performed according to the aging time of the STA. Aging times of STAs in the level list may be set separately, or may be set to a same value. For example, a same aging time is set for all STAs in the level list, and is set to 72 hours, that is, validity times of the STAs in the level list are 72 hours. For step 303, when it is determined that the second STA exists in the level list, it is determined first whether the aging time of the second STA is reached. As shown in FIG. 4, the following step 401 to step 403 are performed.

401: When the second STA exists in the level list, determine whether a first STA corresponding to the second STA reaches an aging time, where the aging time is a validity time of a STA in the level list.

When it is determined that the identifier of the second STA is consistent with an identifier of the first STA in the level list, it is determined whether the aging time of the first STA is reached.

402: When the first STA reaches the aging time, delete the identifier of the first STA and first average data usage corresponding to the first STA that are in the level list, and to-be-processed data of the second STA.

When the first STA reaches the aging time, it indicates that the first STA is invalid in the level list, and the identifier of the first STA and the first average data usage corresponding to the first STA that are in the level list, and the to-be-processed data of the second STA are deleted.

403: When the first STA does not reach the aging time, acquire the network connection information, within the predetermined time, of the second STA.

When the first STA does not reach the aging time, it indicates that the first STA is still valid in the level list, and then the network connection information, within the predetermined time, of the second STA is acquired, a series of processing is performed according to the network connection information, within the predetermined time, of the second STA, and a level of the first STA corresponding to the second STA in the level list is updated.

304: Compare amounts of second average data usage of the second STA and first average data usage of a first STA, in the level list, corresponding to the identifier of the second STA, where the second average data usage of the second STA is a ratio between accumulated data usage and accumulated network connection duration of the second STA.

The network connection information acquired in step 403 includes the accumulated data usage, the accumulated network connection duration, and an accumulated quantity of times of network connections that are within the predetermined time and of the second STA. The second average data usage of the second STA is obtained according to the ratio between the accumulated data usage and the accumulated network connection duration that are within the predetermined time and of the second STA, and the second average data usage is compared with the first average data usage of the first STA, in the level list, corresponding to the identifier of the second STA. The amounts of the second average data usage and the first average data usage are compared, to learn whether the average data usage of the second STA changes, so as to update a level of the second STA in the level list according to a comparison result.

305: Update a level of the second STA in the level list according to a result of the comparison between the second average data usage of the second STA and the first average data usage of the first STA.

Figure 5:
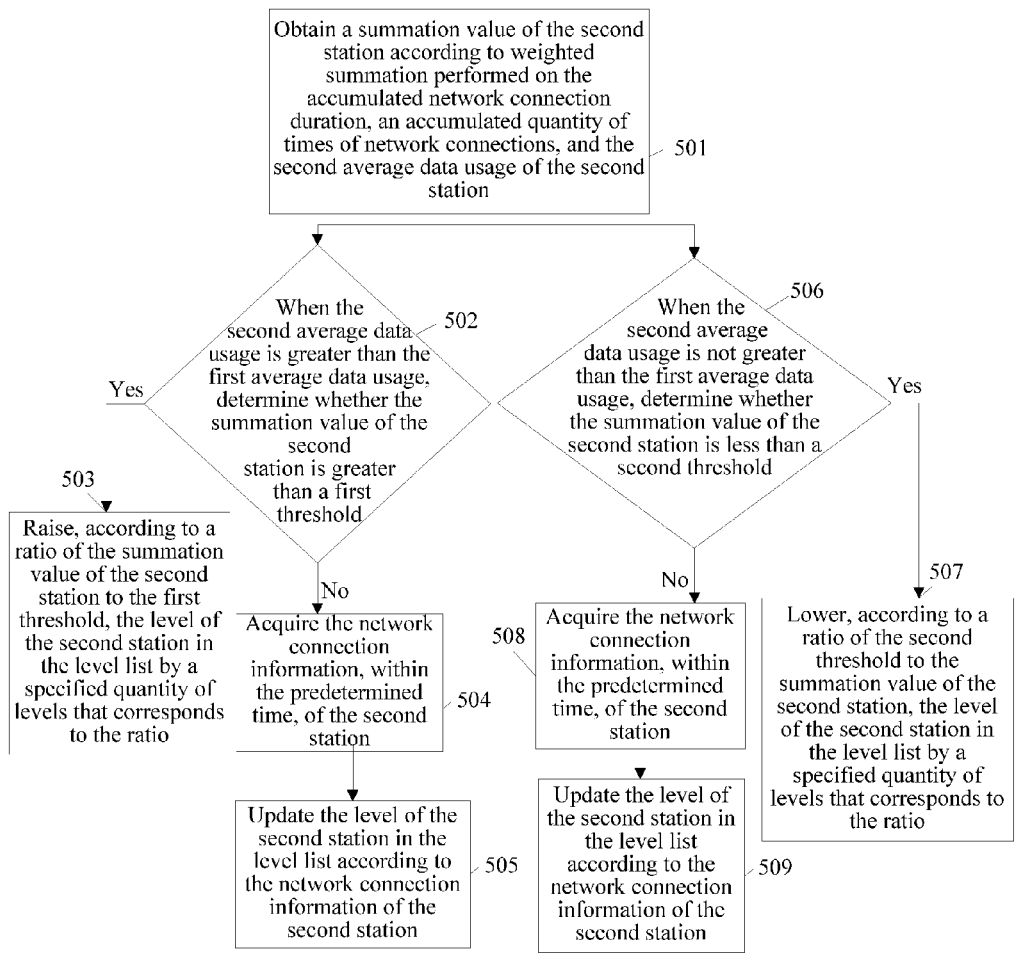
FIG. 5 is a flowchart of implementation of step 305 in the scheduling and processing method for a WiFi station according to the embodiment of the present disclosure.

The level of the second STA in the level list is updated according to the comparison result in step 304, for example, the level is raised or lowered. As shown in FIG. 5, for step 305, the updating a level of the second STA in the level list according to a result of the comparison between the second average data usage of the second STA and the first average data usage of the first STA includes the following steps.

501: Obtain a summation value of the second STA according to weighted summation performed on the accumulated network connection duration, an accumulated quantity of times of network connections, and the second average data usage of the second STA, where three weight values of the weighted summation of the second STA are all greater than or equal to 0, a sum of the three weight values is 1, and at least one of the weight values is not 0.

For example, it is assumed that the accumulated network connection duration of the second STA is K, and a corresponding weight value is d; the accumulated quantity of times of network connections is L, and a corresponding weight value is i; and the second average data usage is M, and a corresponding weight value is j. A summation value N of the second STA is obtained by using a formula (5), where the formula (5) is shown in the following:

$$N=d*K+i*L+j*M \quad (5);$$

where setting of the weight values d, i, and j is the same as setting of the weight values e, f, and g in step 202.

502: When the second average data usage is greater than the first average data usage, determine whether the summation value of the second STA is greater than a first threshold.

When it is determined in step 304 that the second average data usage is greater than the first average data usage, it is determined whether the summation value, obtained in step 501, of the second STA is greater than the first threshold. It is determined whether the summation value of the second STA is greater than the first threshold, to determine whether to raise the level of the second STA in the level list. For example, the first threshold may be set to 80 or another numerical value, and is set by a user according to a requirement.

503: When the summation value of the second STA is greater than the first threshold, raise, according to a ratio of the summation value of the second STA to the first threshold, the level of the second STA in the level list by a specified quantity of levels that corresponds to the ratio.

When the summation value of the second STA is greater than the first threshold, it indicates that services of the second STA are increased, and a priority of the second STA in the level list needs to be raised. For example, when the summation value of the second STA is 200, and the first threshold is 80, the summation value of the second STA is greater than the first threshold, and the level of the second STA in the level list is raised by two levels according to the ratio of the summation value of the second STA to the first threshold, that is, a ratio of 200 to 80 is 2.5.

Optionally, the level in the level list may also be raised by a specified quantity of levels, which is not limited herein, and is set by a user autonomously according to a requirement.

504: When the summation value of the second STA is not greater than the first threshold, acquire the network connection information, within the predetermined time, of the second STA.

505: Update the level of the second STA in the level list according to the network connection information of the second STA.

When the summation value of the second STA is not greater than the first threshold, it indicates that the services of the second STA are not increased, and then, the priority of the second STA in the level list remains unchanged, the network connection information, within the predetermined time, of the second STA is acquired, and the level of the second STA in the level list is updated according to the network connection information of the second STA, that is, step 303 is performed.

506: When the second average data usage is not greater than the first average data usage, determine whether the summation value of the second STA is less than a second threshold.

When it is determined in step 304 that the second average data usage is not greater than the first average data usage, it is determined whether the summation value, obtained in step 501, of the second STA is less than the second threshold. Values of the summation value of the second STA and the second threshold are determined, to determine whether to lower the level of the second STA in the level list. For example, the second threshold may be set to 60 or another numerical value, and is set by a user according to a requirement.

Figure 6:
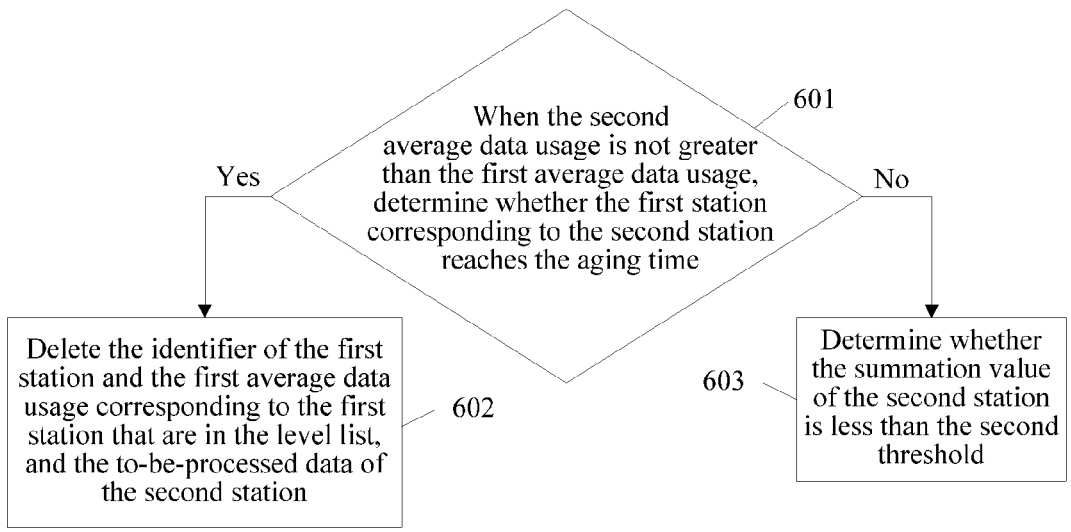
FIG. 6 is a flowchart of implementation of step 506 in the scheduling and processing method for a WiFi station according to the embodiment of the present disclosure.

For step 506, when the second average data usage is not greater than the first average data usage, it indicates that the services of the second STA are reduced. The aging time of the second STA is checked, to determine whether the second STA is still valid. As shown in FIG. 6, step 601 to step 603 are included.

601: When the second average data usage is not greater than the first average data usage, determine whether the first STA corresponding to the second STA reaches the aging time.

602: When the first STA reaches the aging time, delete the identifier of the first STA and the first average data usage corresponding to the first STA that are in the level list, and the to-be-processed data of the second STA.

When the first STA reaches the aging time, it indicates that the first STA is invalid in the level list, and the identifier of the first STA and the first average data usage corresponding to the first STA that are in the level list, and the to-be-processed data of the second STA are deleted.

603: When the first STA does not reach the aging time, determine whether the summation value of the second STA is less than the second threshold.

When the first STA does not reach the aging time, it indicates that the first STA is still valid in the level list, and it is further determined whether the summation value of the second STA is less than the second threshold.

507: When the summation value of the second STA is less than the second threshold, lower, according to a ratio of the second threshold to the summation value of the second STA, the level of the second STA in the level list by a specified quantity of levels that corresponds to the ratio.

When the summation value of the second STA is less than the second threshold, it indicates that services of the second STA are reduced, and a priority of the second STA in the level list needs to be lowered. For example, when the summation value of the second STA is 20, and the second threshold is 60, the summation value of the second STA is less than the second threshold, and the level of the second STA in the level list is lowered by three levels according to the ratio of the second threshold to the summation value of the second STA, that is, a ratio of 60 to 20 is 3.

Optionally, the level in the level list may also be lowered by a specified quantity of levels, which is not limited herein, and is set by a user autonomously according to a requirement.

508: When the summation value of the second STA is not less than the second threshold, acquire the network connection information, within the predetermined time, of the second STA.

509: Update the level of the second STA in the level list according to the network connection information of the second STA.

When the summation value of the second STA is not less than the second threshold, it indicates that the services of the second STA are not reduced, and then, the priority of the second STA in the level list remains unchanged, the network connection information, within the predetermined time, of the second STA is acquired, and the level of the second STA in the level list is updated according to the network connection information of the second STA, that is, step 303 is performed.

The foregoing step 303 to step 305 all describe a case in which the second STA exists in the level list. When the second STA does not exist in the level list, it is determined whether there is a vacancy in the level list; if yes, the identifier of the second STA and to-be-processed data of the second STA are written into the tail of the level list; if not, an identifier of a first STA having a lowest priority in the level list, first average data usage corresponding to the first STA, and to-be-processed data of the first STA are deleted, and then the identifier of the second STA and to-be-processed data of the second STA are written into the tail of the level list; then, network connection information, within the predetermined time, of the second STA is acquired, and the level of the second STA in the level list is updated according to the network connection information of the second STA, that is, step 303 is performed.

Optionally, when the second STA does not exist in the level list, network connection information, within the predetermined time, of the second STA may be first acquired according to step 303, and then summation value of the second STA is obtained according to the network connection information of the second STA by using the formula (5), where the level list includes an identifier of the first STA, first average data usage corresponding to the first STA, and a summation value corresponding to the first STA. The identifier of the second STA and to-be-processed data of the second STA are written into a proper location of the level list in a descending order according to a result of the comparison between the summation value of the second STA and the summation value of the first STA in the level list.

The level list is updated, and the AP schedules and processes to-be-processed data in a logical cache queue of a corresponding STA according to a priority of each STA in the updated level list, that is, because a sequence of the STAs in the level list changes, a sequence of scheduling logical cache queues to be processed is also updated, a logical cache queue corresponding to an upgraded STA is scheduled to the front of the queue, and is processed preferentially, and a logical cache queue corresponding to a degraded STA is scheduled to the back of the queue, and is processed later. Therefore, a STA having a high level among STAs is processed preferentially, and a high-quality service can be provided.

Figure 7:
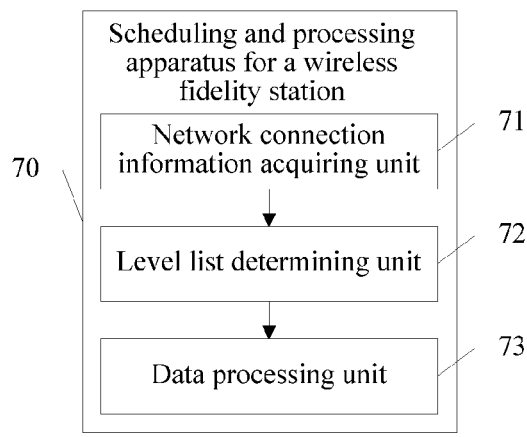
FIG. 7 is a structural diagram of a scheduling and processing apparatus for a WiFi station according to an embodiment of the present disclosure.

As shown in FIG. 7, an embodiment of the present disclosure provides a scheduling and processing apparatus 70 for a WiFi station, where the apparatus includes a network connection information acquiring unit 71, a level list determining unit 72, and a data processing unit 73.

The network connection information acquiring unit 71 is configured to acquire network connection information, within a predetermined time, of STAs that are connected to a WiFi network by means of an AP, where the network connection information includes identifiers of the STAs, and at least one of accumulated network connection duration, accumulated data usage, and accumulated quantities of times of network connections that are within the predetermined time and correspond to the STAs.

The level list determining unit 72 is configured to sort the network connection information, acquired by the acquiring unit, of the STAs in accordance with priorities according to a predetermined algorithm, to obtain a level list of the STAs, where the level list records a level sequence of the STAs in the level list.

The data processing unit 73 is configured to schedule and process to-be-processed data of a corresponding STA according to the sequence of the level list that is obtained by the level list determining unit.

In the scheduling and processing apparatus for a WiFi station provided in this embodiment of the present disclosure, an AP acquires network connection information, within a predetermined time, of STAs that are connected to a WiFi network by means of the AP; sorts the network connection information of the STAs in accordance with priorities according to a predetermined algorithm, to obtain a level list of the STAs; and schedules and processes to-be-processed data of a corresponding STA according to the level list. This embodiment of the present disclosure resolves a prior-art problem that when multiple STAs are connected to WiFi by means of one AP at the same time, due to bandwidth contention, once a STA sensitive to a radio frequency signal is connected to the WiFi, the STA may occupy almost all bandwidth for data exchange, while the other STAs can only receive data and cannot send data, causing a decrease in quality of service of data transmission of the other STAs; implements effective and balanced data transmission of multiple STAs; and improves quality of service of the multiple STAs.

Figure 8:
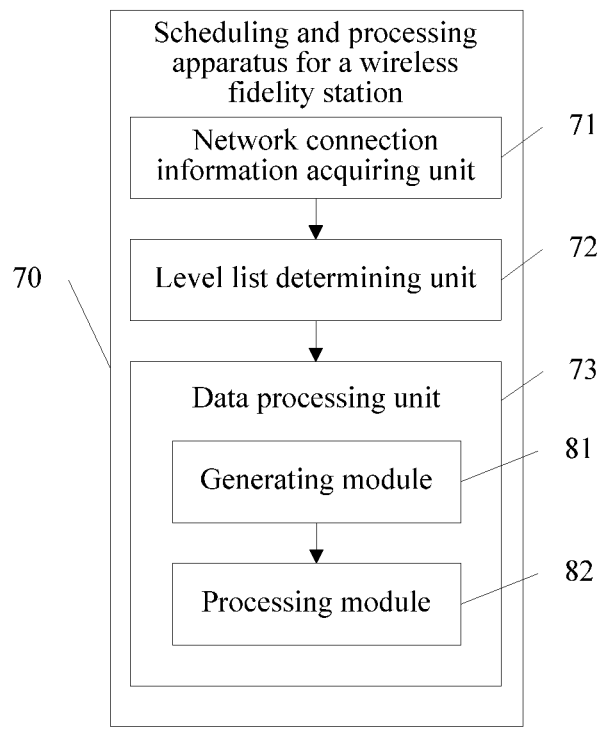
FIG. 8 is a structural diagram of another scheduling and processing apparatus for a WiFi station according to an embodiment of the present disclosure.

Further, as shown in FIG. 8, the data processing unit 73 includes a generating module 81 configured to generate a corresponding logical cache queue of a STA according to the level list, where the logical cache queue of the STA includes to-be-processed data corresponding to the STA; and a processing module 82 configured to schedule and process the to-be-processed data in the corresponding logical cache queue of the STA according to a level sequence in the level list.

Figure 9:
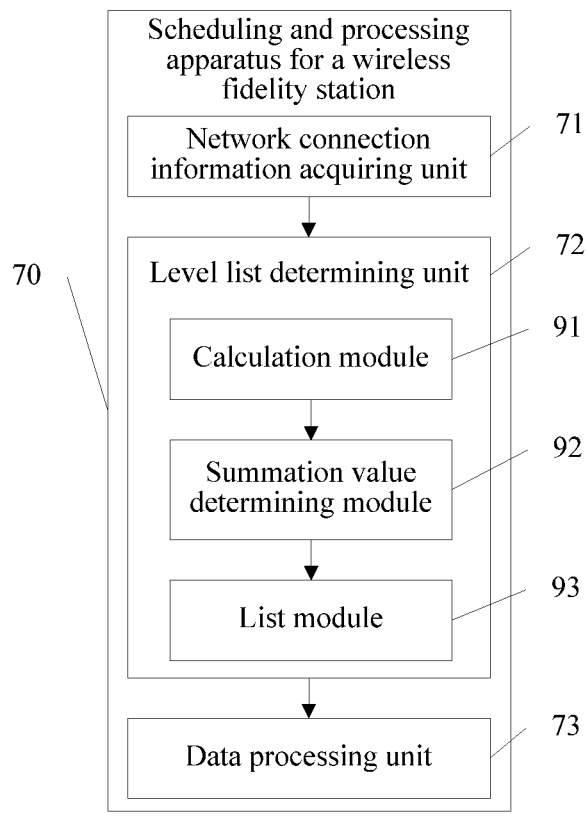
FIG. 9 is a structural diagram of still another scheduling and processing apparatus for a WiFi station according to an embodiment of the present disclosure.

Further, as shown in FIG. 9, the level list determining unit 72 includes a calculation module 91 configured to calculate a ratio between accumulated data usage and accumulated network connection duration that are within the predetermined time and of each of the STAs, to acquire first average data usage of each of the STAs; a summation value determining module 92 configured to obtain a summation value of each of the STAs according to weighted summation performed on the accumulated network connection duration, an accumulated quantity of times of network connections, and the first average data usage of each of the STAs, where three weight values of the weighted summation are all greater than or equal to 0, a sum of the three weight values is 1, and at least one of the weight values is not 0; and a list module 93 configured to sort the STAs according to the summation values in a descending order, to acquire the level list of the STAs, where the level list includes identifiers of the STAs sorted according to the summation values, and first average data usage corresponding to the STAs.

Figure 10:
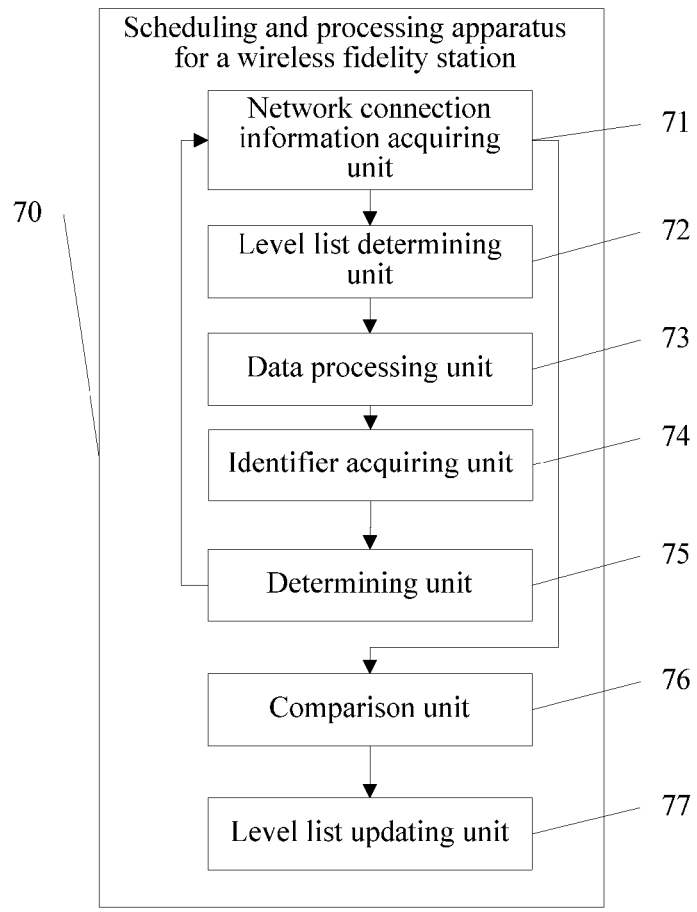
FIG. 10 is a structural diagram of yet another scheduling and processing apparatus for a WiFi station according to an embodiment of the present disclosure.

Optionally, as shown in FIG. 10, the apparatus further includes an identifier acquiring unit 74 configured to acquire an identifier of a second STA that is connected to the WiFi network again by means of the AP; a determining unit 75 configured to determine, by using the identifier of the second STA, whether the second STA exists in the level list, where the network connection information acquiring unit is further configured to, when the second STA exists in the level list, acquire network connection information, within the predetermined time, of the second STA; a comparison unit 76 configured to compare amounts of second average data usage of the second STA and first average data usage of a first STA, in the level list, corresponding to the identifier of the second STA, where the second average data usage of the second STA is a ratio between accumulated data usage and accumulated network connection duration of the second STA; and a level list updating unit 77 configured to update a level of the second STA in the level list according to a result of the comparison between the second average data usage of the second STA and the first average data usage of the first STA.

Figure 11:
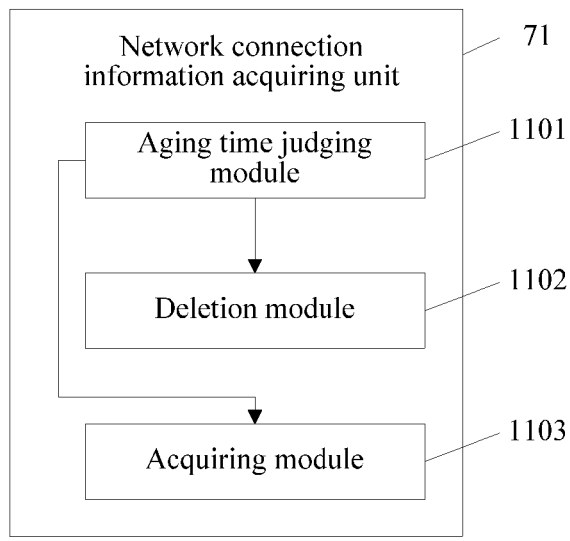
FIG. 11 is a structural diagram of a network connection information acquiring unit in the scheduling and processing apparatus for a WiFi station according to the embodiment of the present disclosure.

Optionally, as shown in FIG. 11, the network connection information acquiring unit 71 includes an aging time determining module 1101 configured to, when the second STA exists in the level list, determine whether the first STA corresponding to the second STA reaches an aging time, where the aging time is a validity time of a STA in the level list; a deletion module 1102 configured to, when the first STA reaches the aging time, delete the identifier of the first STA and the first average data usage corresponding to the first STA that are in the level list, and to-be-processed data of the second STA; and an acquiring module 1103 configured to, when the first STA does not reach the aging time, acquire the network connection information, within the predetermined time, of the second STA.

Figure 12:
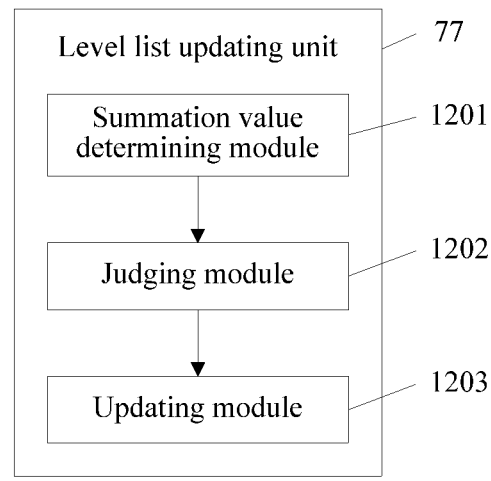
FIG. 12 is a structural diagram of a level list updating unit in the scheduling and processing apparatus for a WiFi station according to the embodiment of the present disclosure.

Optionally, as shown in FIG. 12, the level list updating unit 77 includes a summation value determining module 1201 configured to obtain a summation value of the second STA according to weighted summation performed on the accumulated network connection duration, an accumulated quantity of times of network connections, and the second average data usage of the second STA, where three weight values of the weighted summation of the second STA are all greater than or equal to 0, a sum of the three weight values is 1, and at least one of the weight values is not 0; a judging module 1202 configured to, when the second average data usage is greater than the first average data usage, determine whether the summation value of the second STA is greater than a first threshold; and an updating module 1203 configured to, when the summation value of the second STA is greater than the first threshold, raise, according to a ratio of the summation value of the second STA to the first threshold, the level of the second STA in the level list by a specified quantity of levels that corresponds to the ratio.

Optionally, the network connection information acquiring unit 71 is further configured to, when the summation value of the second STA is not greater than the first threshold, acquire the network connection information, within the predetermined time, of the second STA; and the level list updating unit 77 is further configured to update the level of the second STA in the level list according to the network connection information of the second STA.

Optionally, the determining module 1202 included in the level list updating unit 77 is further configured to, when the second average data usage is not greater than the first average data usage, determine whether the summation value of the second STA is less than a second threshold; and the updating module 1203 is further configured to, when the summation value of the second STA is less than the second threshold, lower, according to a ratio of the second threshold to the summation value of the second STA, the level of the second STA in the level list by a specified quantity of levels that corresponds to the ratio.

Figure 13:
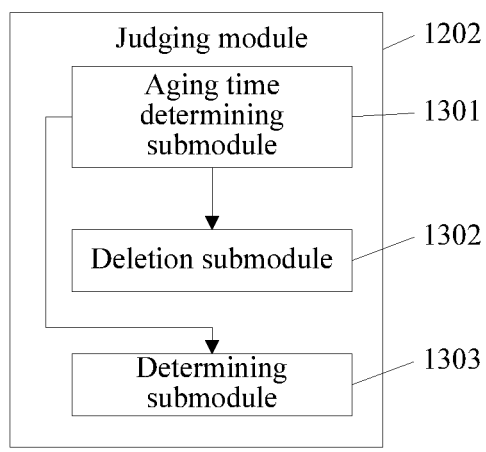
FIG. 13 is a structural diagram of a determining module included in the level list updating unit in the scheduling and processing apparatus for a WiFi station according to the embodiment of the present disclosure.

Optionally, as shown in FIG. 13, the determining module 1202 further includes an aging time determining submodule 1301 configured to, when the second average data usage is not greater than the first average data usage, determine whether the first STA corresponding to the second STA reaches an aging time; a deletion submodule 1302 configured to, when the first STA reaches the aging time, delete the identifier of the first STA and the first average data usage corresponding to the first STA that are in the level list, and to-be-processed data of the second STA; and a determining submodule 1303 configured to, when the first STA does not reach the aging time, determine whether the summation value of the second STA is less than the second threshold.

Optionally, the network connection information acquiring unit 71 is further configured to, when the summation value of the second STA is not less than the second threshold, acquire the network connection information, within the predetermined time, of the second STA; and the level list updating unit 77 is further configured to update the level of the second STA in the level list according to the network connection information of the second STA.

Optionally, the network connection information acquiring unit 71 is further configured to, when the second STA does not exist in the level list, write the identifier of the second STA and to-be-processed data of the second STA into the tail of the level list, and acquire the network connection information, within the predetermined time, of the second STA; and the level list updating unit 77 is further configured to update the level of the second STA in the level list according to the network connection information of the second STA.

Optionally, the network connection information acquiring unit 71 is further configured to, when the second STA does not exist in the level list, acquire the network connection information, within the predetermined time, of the second STA; and the level list updating unit 77 is further configured to write the identifier of the second STA and to-be-processed data of the second STA into a proper location of the level list according to the network connection information of the second STA.

For a specific implementation process of units in the scheduling and processing apparatus 70 for a WiFi station, reference may be made to the processing process of the scheduling and processing method for a WiFi station.

Figure 14:
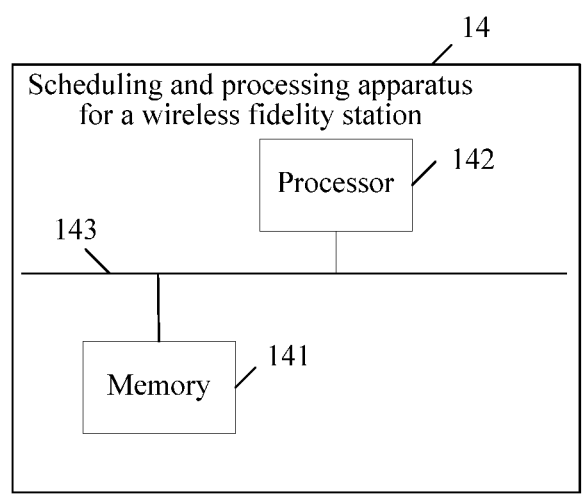
FIG. 14 is a hardware structural diagram of a scheduling and processing apparatus for a WiFi station according to an embodiment of the present disclosure.

All the scheduling and processing apparatuses for a WiFi station shown in FIG. 7 to FIG. 13 can be implemented based on a computer hardware structure. As shown in FIG. 14, a hardware structure of a scheduling and processing apparatus 14 for a WiFi station includes a memory 141, a processor 142, and a bus 143.

The processor 142 is in communication connection to the memory 141 by using the bus 143.

The memory 141 may be a read-only memory (ROM), a static storage device, a dynamic storage device, or a random access memory (RAM). The memory 141 may store an operating system, and an instruction and application data of another application program. The instruction stored in the memory 141 is run and executed by the processor 142.

The memory 141 in this embodiment of the present disclosure may be configured to store an instruction used for implementing functional units in the embodiments shown in FIG. 7 to FIG. 13, network connection information of a STA, a level list, and to-be-processed data.

The processor 142 may be a general-purpose central processing unit (CPU), a microprocessor, an application-specific integrated circuit (ASIC), or one or more integrated circuits, so as to execute a related program.

In this embodiment of the present disclosure, the processor 142 is configured to execute the instruction in the memory 141, and execute: acquiring network connection information, within a predetermined time, of STAs that are connected to a WiFi network by means of an AP, where the network connection information includes identifiers of the STAs, and at least one of accumulated network connection duration, accumulated data usage, and accumulated quantities of times of network connections that are within the predetermined time and correspond to the STAs; sorting the network connection information of the STAs in accordance with priorities according to a predetermined algorithm, to obtain a level list of the STAs, where the level list records a level sequence of the STAs in the level list; and scheduling and processing to-be-processed data of a corresponding STA according to the level list.

For a specific processing process of the processor 142, reference may be made to the method embodiment, and the apparatus embodiments shown in FIG. 3 to FIG. 13, and no further details are provided herein again.

The bus 143 may include a path, to transfer information between components (for example, the processor 142 and the memory 141) of the scheduling and processing apparatus for a WiFi station.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A scheduling and processing method for a wireless fidelity (WiFi) station, comprising:
   acquiring network connection information, within a predetermined time, of stations (STAs) that are connected to a WiFi network using an access point (AP), wherein the network connection information comprises identifiers of the STAs, and at least one of accumulated network connection duration, accumulated data usage, and accumulated quantities of times of network connections that are within the predetermined time and correspond to the STAs;
   sorting the network connection information of the STAs in accordance with priorities according to a predetermined algorithm, to obtain a level list of the STAs, wherein the network connection information of the STAs is sorted based at least in part upon the identifiers of the STAs and the at least one of accumulated network connection duration, accumulated data usage, and accumulated quantities of times of network connections that are within the predetermined time and correspond to the STAs, and wherein the level list records a level sequence of the STAs in the level list; and scheduling and processing to-be-processed data of a corresponding STA according to the level list, wherein sorting the network connection information of the STAs in accordance with priorities according to the predetermined algorithm, to obtain the level list of the STAs comprises:

calculating a ratio between accumulated data usage and accumulated network connection duration that are within the predetermined time and of each of the STAs, to acquire first average data usage of each of the STAs;

obtaining a summation value of each of the STAs according to weighted summation performed on the accumulated network connection duration, an accumulated quantity of times of network connections, and the first average data usage of each of the STAs, wherein three weight values of the weighted summation are all greater than or equal to zero, a sum of the three weight values is one, and at least one of the weight values is not zero; and sorting the STAs according to a sequence of the summation values, to acquire the level list of the STAs, wherein the level list comprises identifiers of the STAs sorted according to the summation values, and the first average data usage corresponding to the STAs.

2. A scheduling and processing method for a wireless fidelity (WiFi) station, comprising:

acquiring network connection information, within a predetermined time, of stations (STAs) that are connected to a WiFi network using an access point (AP), wherein the network connection information comprises identifiers of the STAs, and at least one of accumulated network connection duration, accumulated data usage, and accumulated quantities of times of network connections that are within the predetermined time and correspond to the STAs;

sorting the network connection information of the STAs in accordance with priorities according to a predetermined algorithm, to obtain a level list of the STAs, wherein the network connection information of the STAs is sorted based at least in part upon the identifiers of the STAs and the at least one of accumulated network connection duration, accumulated data usage, and accumulated quantities of times of network connections that are within the predetermined time and correspond to the STAs, and wherein the level list records a level sequence of the STAs in the level list; and scheduling and processing to-be-processed data of a corresponding STA according to the level list, wherein after the AP establishes the level list of the STAs, the method further comprises:

acquiring an identifier of a second STA that is connected to the WiFi network again using the AP, wherein the second STA comprises one of the STAs that are connected to the WiFi network using the AP;

determining, by using the identifier of the second STA, whether the second STA exists in the level list;

acquiring network connection information, within the predetermined time, of the second STA when the second STA exists in the level list;

comparing amounts of second average data usage of the second STA and first average data usage of a first STA, in the level list, corresponding to the identifier of the second STA, wherein the second average data usage of the second STA is a ratio between accumulated data usage and accumulated network connection duration of the second STA, and wherein the first STA comprises another one of the STAs that are connected to the WiFi network using the AP; and updating a level of the second STA in the level list according to a result of the comparison between the second average data usage of the second STA and the first average data usage of the first STA.

3. The scheduling and processing method for the WiFi station according to claim 2, wherein the acquiring network connection information, within the predetermined time, of the second STA when the second STA exists in the level list comprises:

determining whether the first STA corresponding to the second STA reaches an aging time when the second STA exists in the level list, wherein the aging time is a validity time of a STA in the level list;

deleting the identifier of the first STA and the first average data usage corresponding to the first STA that are in the level list, and to-be-processed data of the second STA when the first STA reaches the aging time; and acquiring the network connection information, within the predetermined time, of the second STA when the first STA does not reach the aging time.

4. The scheduling and processing method for the WiFi station according to claim 2, wherein updating the level of the second STA in the level list according to the result of the comparison between the second average data usage of the second STA and the first average data usage of the first STA comprises:

obtaining a summation value of the second STA according to weighted summation performed on the accumulated network connection duration, an accumulated quantity of times of network connections, and the second average data usage of the second STA, wherein three weight values of the weighted summation of the second STA are all greater than or equal to zero, a sum of the three weight values is one, and at least one of the weight values is not zero;

determining whether the summation value of the second STA is greater than a first threshold when the second average data usage is greater than the first average data usage; and raising, according to a ratio of the summation value of the second STA to the first threshold, the level of the second STA in the level list by a specified quantity of levels that corresponds to the ratio when the summation value of the second STA is greater than the first threshold.

5. The scheduling and processing method for the WiFi station according to claim 4, wherein the method further comprises:

acquiring the network connection information, within the predetermined time, of the second STA when the summation value of the second STA is not greater than the first threshold; and updating the level of the second STA in the level list according to the network connection information of the second STA.

6. The scheduling and processing method for the WiFi station according to claim 4, wherein the method further comprises:
  determining, when the second average data usage is not greater than the first average data usage, whether the summation value of the second STA is less than a second threshold; and
  lowering, according to a ratio of the second threshold to the summation value of the second STA, the level of the second STA in the level list by a specified quantity of levels that corresponds to the ratio when the summation value of the second STA is less than the second threshold.

7. The scheduling and processing method for the WiFi station according to claim 6, wherein determining, when the second average data usage is not greater than the first average data usage, whether the summation value of the second STA is less than the second threshold comprises:
  determining whether the first STA corresponding to the second STA reaches the aging time when the second average data usage is not greater than the first average data usage;
  deleting the identifier of the first STA and the first average data usage corresponding to the first STA that are in the level list, and the to-be-processed data of the second STA when the first STA reaches the aging time; and
  determining whether the summation value of the second STA is less than the second threshold when the first STA does not reach the aging time.

8. The scheduling and processing method for the WiFi station according to claim 6, wherein the method further comprises:
  acquiring the network connection information, within the predetermined time, of the second STA when the summation value of the second STA is not less than the second threshold; and
  updating the level of the second STA in the level list according to the network connection information of the second STA.

9. The scheduling and processing method for the WiFi station according to claim 2, wherein the method further comprises:
  writing the identifier of the second STA and to-be-processed data of the second STA into and a corresponding logical cache queue respectively the tail of the level list, and acquiring network connection information, within the predetermined time, of the second STA when the second STA does not exist in the level list; and
  updating the level of the second STA in the level list according to the network connection information of the second STA.

10. The scheduling and processing method for the WiFi station according to claim 2, wherein the method further comprises:
  acquiring network connection information, within the predetermined time, of the second STA when the second STA does not exist in the level list; and
  writing the identifier of the second STA and to-be-processed data of the second STA into a proper location of the level list according to the network connection information of the second STA.

11. A scheduling and processing apparatus for a wireless fidelity (WiFi) station, wherein the scheduling and processing apparatus is implemented as part of an access point (AP) of a WiFi network, and wherein the scheduling and processing apparatus comprises:
  a memory comprising instructions; and
  a computer processor coupled to the memory, wherein the instructions cause the computer processor to be configured to:
    acquire network connection information, within a predetermined time, of stations (STAs) that are connected to the WiFi network using the AP, wherein the network connection information comprises identifiers of the STAs, and at least one of accumulated network connection duration, accumulated data usage, and accumulated quantities of times of network connections that are within the predetermined time and correspond to the STAs;
    sort the network connection information of the STAs in accordance with priorities according to a predetermined algorithm, to obtain a level list of the STAs, wherein the network connection information of the STAs is sorted based at least in part upon the identifiers of the STAs and the at least one of accumulated network connection duration, accumulated data usage, and accumulated quantities of times of network connections that are within the predetermined time and correspond to the STAs, and wherein the level list records a level sequence of the STAs in the level list;
    schedule and process to-be-processed data of a corresponding STA according to the level list of the STAs;
    calculate a ratio between accumulated data usage and accumulated network connection duration that are within the predetermined time and of each of the STAs, to acquire first average data usage of each of the STAs;
    obtain a summation value of each of the STAs according to weighted summation performed on the accumulated network connection duration, an accumulated quantity of times of network connections, and the first average data usage of each of the STAs, wherein three weight values of the weighted summation are all greater than or equal to zero, a sum of the three weight values is one, and at least one of the weight values is not zero; and
    sort the STAs according to the summation values in a descending order, to acquire the level list of the STAs, wherein the level list comprises identifiers of the STAs sorted according to the summation values, and first average data usage corresponding to the STAs.

12. A scheduling and processing apparatus for a wireless fidelity (WiFi) station, wherein the scheduling and processing apparatus is implemented as part of an access point (AP) of a WiFi network, and wherein the scheduling and processing apparatus comprises:
  a memory comprising instructions; and
  a computer processor coupled to the memory, wherein the instructions cause the computer processor to be configured to:
    acquire network connection information, within a predetermined time, of stations (STAs) that are connected to the WiFi network using the AP, wherein the network connection information comprises identifiers of the STAs, and at least one of accumulated network connection duration, accumulated data usage, and accumulated quantities of times of network connections that are within the predetermined time and correspond to the STAs;
    sort the network connection information of the STAs in accordance with priorities according to a predetermined algorithm, to obtain a level list of the STAs, wherein the network connection information of the STAs is sorted based at least in part upon the identifiers of the STAs and the at least one of accumulated network connection duration, accumulated data usage, and accumulated quantities of times of network connections that are within the predetermined time and correspond to the STAs, and wherein the level list records a level sequence of the STAs in the level list;

schedule and process to-be-processed data of a corresponding STA according to the level list of the STAs;

acquire an identifier of a second STA that is connected to the WiFi network again using the AP, wherein the second STA comprises one of the STAs that are connected to the WiFi network using the AP;

determine, by using the identifier of the second STA, whether the second STA exists in the level list;

acquire network connection information, within the predetermined time, of the second STA when the second STA exists in the level list;

compare amounts of second average data usage of the second STA and first average data usage of a first STA, in the level list, corresponding to the identifier of the second STA, wherein the second average data usage of the second STA is a ratio between accumulated data usage and accumulated network connection duration of the second STA, and wherein the first STA comprises another one of the STAs that are connected to the WiFi network using the AP; and update a level of the second STA in the level list according to a result of the comparison between the second average data usage of the second STA and the first average data usage of the first STA.

13. The scheduling and processing apparatus for the WiFi station according to claim 12, wherein the instructions further cause the computer processor to be configured to:
determine whether the first STA corresponding to the second STA reaches an aging time when the second STA exists in the level list, wherein the aging time is a validity time of a STA in the level list;
delete the identifier of the first STA and the first average data usage corresponding to the first STA that are in the level list, and to-be-processed data of the second STA when the first STA reaches the aging time; and
acquire the network connection information, within the predetermined time, of the second STA when the first STA does not reach the aging time.

14. The scheduling and processing apparatus for the WiFi station according to claim 12, wherein the instructions further cause the computer processor to be configured to:
obtain a summation value of the second STA according to weighted summation performed on the accumulated network connection duration, an accumulated quantity of times of network connections, and the second average data usage of the second STA, wherein three weight values of the weighted summation of the second STA are all greater than or equal to zero, a sum of the three weight values is one, and at least one of the weight values is not zero;

determine whether the summation value of the second STA is greater than a first threshold when the second average data usage is greater than the first average data usage; and
raise, according to a ratio of the summation value of the second STA to the first threshold, the level of the second STA in the level list by a specified quantity of levels that corresponds to the ratio when the summation value of the second STA is greater than the first threshold.

15. The scheduling and processing apparatus for the WiFi station according to claim 14, wherein the instructions further cause the computer processor to be configured to:
acquire the network connection information, within the predetermined time, of the second STA when the summation value of the second STA is not greater than the first threshold; and
update the level of the second STA in the level list according to the network connection information of the second STA.

16. The scheduling and processing apparatus for the WiFi station according to claim 14, wherein the instructions further cause the computer processor to be configured to:
determine whether the summation value of the second STA is less than a second threshold when the second average data usage is not greater than the first average data usage; and
lower, according to a ratio of the second threshold to the summation value of the second STA, the level of the second STA in the level list by a specified quantity of levels that corresponds to the ratio when the summation value of the second STA is less than the second threshold.

17. The scheduling and processing apparatus for the WiFi station according to claim 16, wherein the instructions further cause the computer processor to be configured to:
determine whether the first STA corresponding to the second STA reaches the aging time when the second average data usage is not greater than the first average data usage;
delete the identifier of the first STA and the first average data usage corresponding to the first STA that are in the level list, and the to-be-processed data of the second STA when the first STA reaches the aging time; and
determine whether the summation value of the second STA is less than the second threshold when the first STA does not reach the aging time.

18. The scheduling and processing apparatus for the WiFi station according to claim 16, wherein the instructions further cause the computer processor to be configured to:
acquire the network connection information, within the predetermined time, of the second STA when the summation value of the second STA is not less than the second threshold; and
update the level of the second STA in the level list according to the network connection information of the second STA.

* * * * *